No. 838,753. PATENTED DEC. 18, 1906.
J. C. SEELAND.
SEMEN CARRIER.
APPLICATION FILED JAN. 27, 1906. RENEWED OCT. 24, 1906.

WITNESSES:
Grant Shears.
L. B. Maxson.

INVENTOR
John C. Seeland.
BY
Pierre Barnes
ATTORNEY

UNITED STATES PATENT OFFICE.

JOHN C. SEELAND, OF CHRISTOPHER, WASHINGTON.

SEMEN-CARRIER.

No. 838,753.        Specification of Letters Patent.        Patented Dec. 18, 1906.

Application filed January 27, 1906. Renewed October 24, 1906. Serial No. 340,383.

*To all whom it may concern:*

Be it known that I, JOHN C. SEELAND, a citizen of the United States, residing at Christopher, in the county of King and State of Washington, have invented certain new and useful Improvements in Semen-Carriers, of which the following is a specification, reference being had therein to the accompanying drawings, in which—

Figure 2:
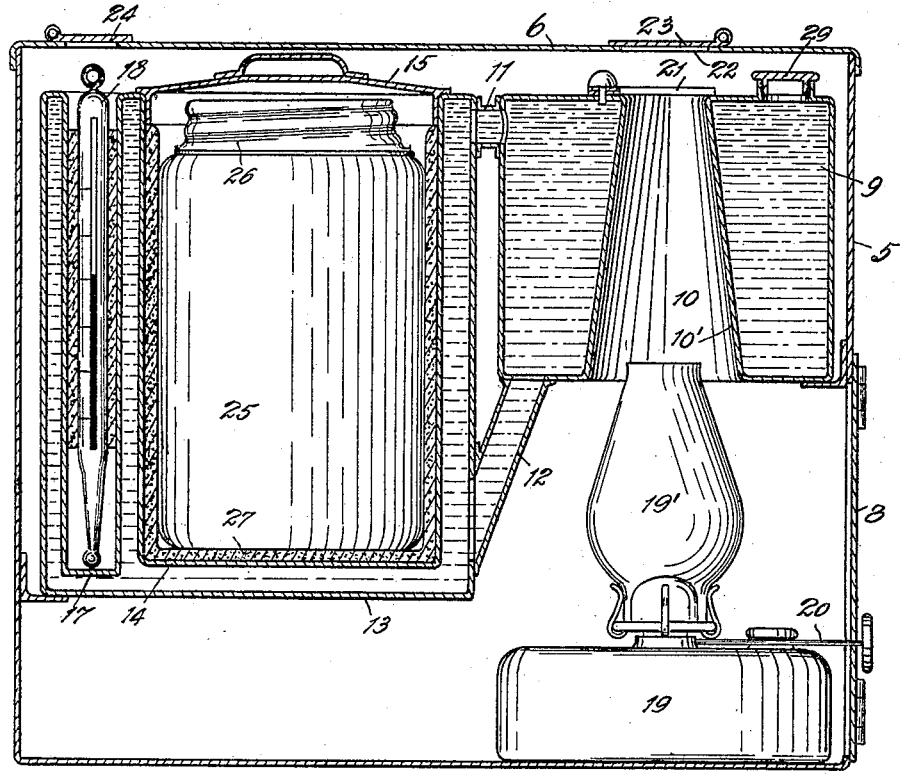
Figure 1:
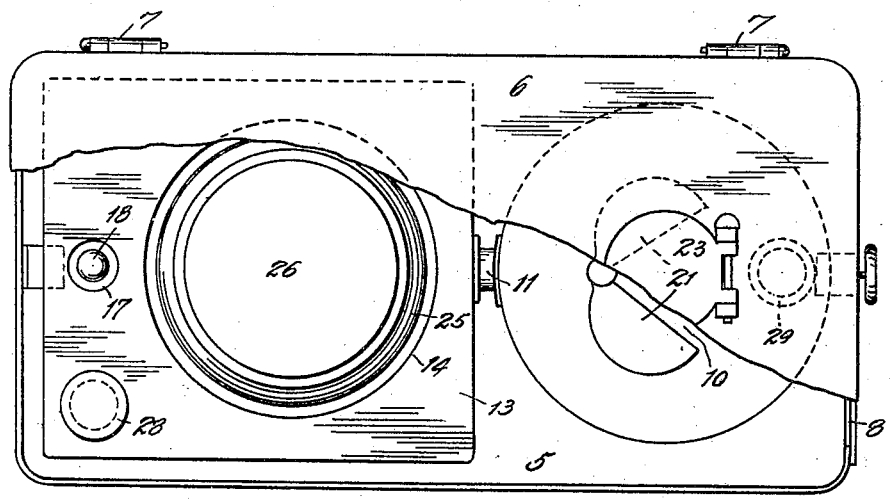

Figure 1 is a plan view of an embodiment of my invention with the top of the outer casing shown partly broken away, and Fig. 2 is a vertical longitudinal section of the same.

This invention has relation to devices employed in the breeding of live-stock; and its object is to produce a receptacle for the male generative fluid and in which it is capable of being preserved for an indefinite period in a fecund state, and thus reliably and conveniently transported to considerable distances from the place of procurement.

To these ends the invention consists in the general and specific details of construction and combinations thereof, as will be hereinafter described, and pointed out in the claims.

In the said drawings the reference-numeral 5 designates an outer casing, preferably made of sheet metal and provided with a top or cover 6, which is desirably openable upon hinges 7, and a door 8 at an end, whereby access is had to the heating-lamp. Interiorly of the casing and adjacent to the said door is a water-receptacle 9, having a centrally-disposed draft-flue 10, which is desirably formed with a conical wall 10'. Conduits 11 and 12 communicatively connect the said water-receptacle in proximity of its top and bottom with another water-receptacle 13, into which depends a well 14, having a removable cover 15. Protruding downwardly into the receptacle 13 is a tube 17 for the reception of a thermometer 18, wherewith the temperature of the surrounding water may be ascertained. The aforesaid lamp 19 may be of ordinary or suitable construction and is when in operation placed below the said flue and into which its chimney 19' desirably extends in order to deliver the heat from the flame most effectively and moderately to the water in the receptacle above. The spindle 20 of the lamp-burner is extended outside of the casing for the purpose of affording means to regulate the size of the flame without opening the said door.

At the upper extremity of the flue is a two-part shutter 21, openable upon a pin and manipulated through an aperture 22 in the casing-cover thereabove, which is provided with a lid 23, capable of being utilized for regulating the draft or escape of the heated air and combustion products from the interior of the casing. A lid 24 is also provided for an opening in said cover and above the tube 17, through which the thermometer may from time to time be withdrawn for inspection.

25 is a semen-container, which is desirably a glass jar, such as commonly employed for canned goods, and similarly is provided with a removable screw-top 26. In order to safeguard the jar from breakage through careless handling, and likewise the thermometer, the respective receptacles therefor are desirably lined with felt or its equivalent, as indicated by 27. Screw-plugs 28 and 29 are respectively employed for closing aperture in the tops of the said water-receptacles, and through such holes the latter are replenished or emptied of water.

From the aforedescribed arrangement of the water-receptacles 9 and 13 and the peculiar connections therebetween it is apparent that heat imparted from the lamp to the water in the former will create a circulation of the fluid and cause it to flow in an ascending current through the receptacle 13, into which protrude the well containing the semen-jar and the tube containing the thermometer and tending to maintain the same at a more uniform temperature than if subjected to the direct action of the water where heated. In practice the sperm or semen is taken from the male generative organs and discharged into the jar 25 with a syringe or otherwise and the jar placed in the said well. The cover is now closed, and by controlling the temperature of the water through the regulation of the heating-flame and the various said draft-openings the spermatozvoids of the generative fluid may be preserved for long time in a fecund condition. Numbers of females may be impregnated by serving them with semen from the jar by the use of a syringe, a process well understood in the art.

Having described my invention, what I claim as new, and desire to secure by Letters Patent, is—

1. In a device of the class described, in combination with the external casing; of two water-receptacles communicatively connected with each other, a well depending into one of said receptacles, a means for heating the water in the other of the receptacles, and a removable jar within said well.

2. In a device of the class described, in combination with an external casing, a water-receptacle provided with a flue extending therethrough, and a heating means; of another water-receptacle connected with the first-named one by conduits disposed at different levels, a depending well within the second-named receptacle, a tube depending in this receptacle, adapted to receive a thermometer, and a semen-container adapted to be placed within said well.

3. In a device of the class described, the combination of an external casing provided with an openable top and a door, a water-receptable, means to heat the water within the receptacle, another water-receptacle connected to the first-named one so that water is free to circulate therebetween, a semen-container, and a well depending within the second-named receptacle for the reception of said container.

4. In a device of the class described, the combination of the external casing provided with an openable top, a water-receptacle adapted to be heated with a lamp placed therebelow, said lamp, another water-receptacle provided with a well for the reception of a jar, said receptacles being connected to permit of the free circulation of the water therebetween and about the said well.

In testimony whereof I affix my signature in presence of two witnesses.

JOHN C. SEELAND.

Witnesses:
PIERRE BARNES,
R. B. GILLIES.